E. L. YOUNG.
CARRIER FOR BALED STRAW AND THE LIKE.
APPLICATION FILED JULY 24, 1914.
1,150,320. Patented Aug. 17, 1915.
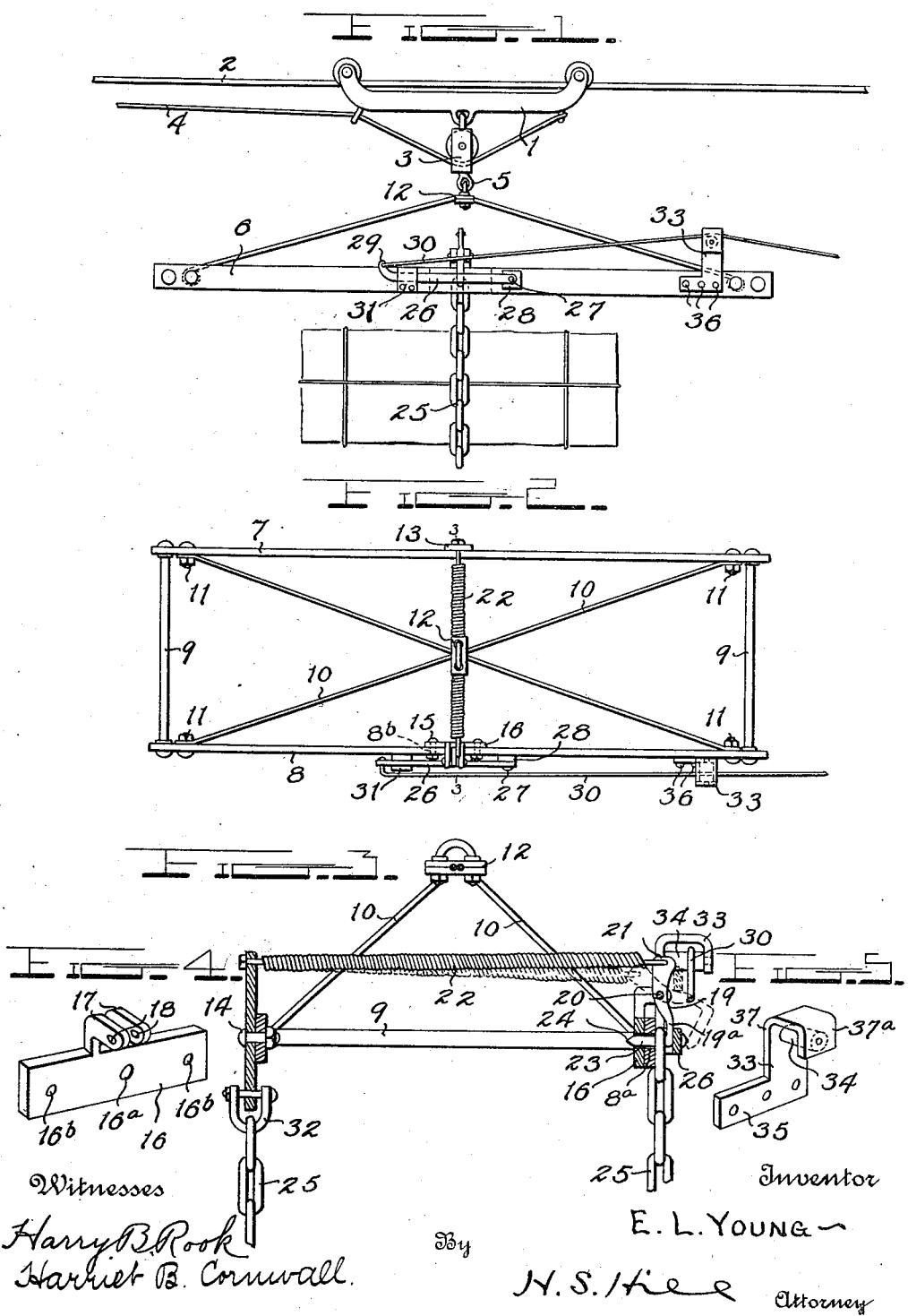

UNITED STATES PATENT OFFICE.

ELMER L. YOUNG, OF HOLDER, ILLINOIS.

CARRIER FOR BALED STRAW AND THE LIKE.

1,150,320.

Specification of Letters Patent.

Patented Aug. 17, 1915.

Application filed July 24, 1914. Serial No. 852,798.

*To all whom it may concern:*

Be it known that I, ELMER L. YOUNG, a citizen of the United States, residing at Holder, in the county of McLean and State of Illinois, have invented certain new and useful Improvements in Carriers for Baled Straw and the like, of which the following is a specification.

The present invention relates to certain new and useful improvements in carriers for baled straw and the like, and has for its object to provide a device of this character which may be easily attached to the usual hay carriers and which is adapted to drop or release the bales of hay, straw or the like at any desirable point by means of a novel form of trip mechanism.

A further object is to provide a device of the character described which is simple and inexpensive in its construction and which will not easily get out of repair.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of one embodiment of the invention showing the same carrying a bale and attached to the carriage of the usual hay carrier. Fig. 2 is a top plan view of the same detached from the hay carrier. Fig. 3 is an enlarged transverse sectional view on the line 3—3 of Fig. 2. Fig. 4 is a detail perspective view of the trip hook supporting bracket. Fig. 5 is a similar view of the pulley and bracket supporting the same over which the trip rope operates.

Corresponding and like parts are referred to in the following description and indicated in all the views of the drawing by the same reference characters.

Specifically describing the invention, the numeral 1 designates the usual traveling carriage of a hay carrier which is mounted to travel along a cable or track 2, said carriage being provided with the usual hay fork tripping mechanism 3 and trip rope 4, the hay carrying forks being removed. The lower portion of the hay fork tripping mechanism is provided with a hook 5 suspended from which is a baled straw carrier 6. This baled straw carrier 6 is composed of two oppositely disposed parallel side bars 7 and 8 which are secured together at their opposite ends by means of the cross bars 9, the side bar 8 being provided with a hole $8^a$ near its center to receive the trip hook, and bolt holes $8^b$. A pair of longitudinally extending suspension cables or bars 10 have their ends bolted at 11 to the respective side bars 7 and 8 near the ends thereof, said cables 10 being secured together at substantially their central points by a clamp 12 which engages the hook 5 of the hay carrier to suspend the baled straw carrier therefrom.

A vertically disposed plate 13 is secured by a bolt 14 to the side bar 7 at substantially the center thereof, while the side bar 8 has secured thereto by the bolts 15 a trip hook supporting bracket 16, said bracket being fastened to the inner side of the side bar 8. This bracket 16 is provided with a hole $16^a$ near its center, said hole being adapted to register with the hole $8^a$ in the side bar 8 to receive the trip hook, and also with holes $16^b$ adapted to register with the holes $8^b$. The bracket 16 is further provided near its center with upwardly and laterally extending, spaced apart ears 17 provided with holes 18 near the outer ends thereof.

A trip hook 19 is pivoted upon a pin 20 which passes through the holes 18 of the bracket ears 17, said hook being provided with an upwardly extending shank or flat end 21 to which is fastened one end of a spring 22, the other end of which is fastened to the top of the vertically disposed plate 13 on the side bar 7. The opposite and lower end of the hook 19 is returned inwardly to form a hook arm 23 the outer extremity of which is preferably pointed as at 24, said arm 23 being adapted to enter the holes $8^a$ and $16^a$ of the side bar 8 and bracket 16 respectively, when in its operative position. The spring 22 tends to swing the hook 19 about its pivot so as to disengage the arm 23 thereof from the holes $8^a$ and $16^a$, while a locking lever 26, pivoted at 27 to the side bar 8 and spaced therefrom by a plate 28, tends to retain the arm 23 of the hook 19 in said holes. This lever 26 engages the outer side of the shank $19^a$ of the hook 19, and has one end thereof upturned at 29 to which upturned end is secured a trip rope 30, while to prevent the lever 26 from swinging downwardly below the side bar 8 a stop plate 31 is provided, said plate 31 being offset to allow the end of the lever 26 to rest upon the plate between the same and the side bar 8. It will thus be obvious that the locking lever 26 normally overcomes the tendency of the spring to pull the arm 23 from the holes 8ª and 16ª and that should the lever 26 be pulled upwardly out of engagement with the hook 19 the spring 22 would swing the same about its pivot and withdraw the arm 23 from the holes. One link of a chain 25 is engaged by the arm 23 between the side bar 8 and the shank 19ª of the hook 19 when the device is in operative position, the opposite end of the chain being permanently fastened to the plate 13 on the side bar 7 by means of a shackle 32.

A bracket 33 is provided at one end of the side bar 8, said bracket having a pulley 34 mounted therein over which is adapted to pass the trip rope 30, one end of which is secured to the lever 26 while the opposite end thereof is adapted to be pulled upon by the person desiring to operate the trip. This bracket consists of a foot 35 fastened to the bar 8 by bolts or rivets 36 and an arm 37, the upper end of which is returned at 37ª parallel to and at a distance from itself to form bearings for the pulley.

In the operation of the device the chain 25 is wrapped around the bales desired to be carried away and one link of the chain placed in engagement with the arm 23 of the hook 19 which is then forced into the holes 8ª and 16ª against the action of the spring 22. The lever 26 is then swung downwardly so as to engage the hook 19 to retain the same in position, the swinging end of the lever resting on the keeper plate 31. The hay carrier carriage is then moved until the place at which it is desired to deposit the bales is reached, when the trip rope 30 is pulled upon. This raises the lever 26 from engagement with the hook 19 which is then swung about its pivot 20 by the spring 22, thus withdrawing the hooked end 23 thereof from the holes 8ª and 16ª, whereupon the link of the chain 25 which rested on the arm 23 of the hook slides therefrom, dropping the bales at the desired place.

It will thus be seen that the above device is very desirable, as being adapted to be suspended from the usual hay carrier it needs no carriage of its own, and it may be readily attached and detached from the hay carrier as desired. Furthermore, it is provided with a quick and easily operated trip of its own which greatly facilitates in loading the bales upon and unloading them from the bale carrier.

Having thus described the invention, what I claim as new and desire to secure by Letters Patent, is:—

1. A carrier for baled straw and the like, including a frame formed with spaced side bars, means for supporting the frame, a bale supporting chain, means upon one of the side bars for engaging one end of the bale supporting chain, a transversely swinging trip hook mounted upon the opposite side bar for engaging a selected link of the chain, yielding means normally tending to swing the trip hook into inoperative position, a longitudinally swinging latch bar mounted upon the side bar for engagement with the transversely swinging trip hook to hold the latter in operative position, and means for swinging the latch bar into inoperative position.

2. A carrier for baled straw and the like, including a frame formed with spaced side bars, means for supporting the frame, a bale supporting chain, means upon one of the side bars for engaging an end of the bale supporting chain, a pivoted trip hook mounted upon the opposite side bar to swing transversely with respect thereto, said trip hook being formed with a nose adapted to coöperate with the side bar to engage a selected link of the bale supporting chain, yielding means normally tending to swing the nose of the trip hook out of operative relation with the side bar, and latch means for holding the nose of the trip hook in coöperative relation with the side bar.

3. A carrier for baled straw and the like, including a frame formed with spaced side bars one of which is formed with an opening, means for supporting the frame, a plate applied to the opposite side bar, a bale supporting chain having one end thereof applied to the plate, a trip hook carried by the opposite side bar and mounted to swing transversely with respect thereto, said hook being formed with a nose adapted to engage a selected link of the bale supporting chain and enter the before mentioned opening of the side bar, a spring connecting the hook and plate and normally tending to swing the hook into inoperative position, and a latch bar pivotally mounted upon the side bar to swing longitudinally thereof, said latch bar being adapted to engage the trip hook to hold the same in operative position.

4. A carrier for baled straw and the like, including a frame formed with side bars, means for supporting the frame, one of which is formed with an opening, a plate applied to the opposite side bar, a bale supporting chain having one end thereof connected to the plate, a bracket applied to the opposite side bar and formed with an opening registering with the opening therein, said bracket being formed with a laterally projecting ear, a transversely swinging trip hook pivoted upon the said ear and formed with a nose adapted to engage a selected link of the bale supporting chain and enter the corresponding openings of the side bar and bracket, a spring connecting the trip hook and plate and normally tending to swing the trip hook into inoperative position, a longitudinally swinging latch bar mounted upon the side bar and adapted to engage the trip hook to hold the same in operative position, and means for moving the latch bar into inoperative position.

5. A carrier for baled straw and the like, including a frame formed with spaced side bars one of which is formed with an opening, means for supporting the frame, a plate applied to the opposite side bar, a bale supporting chain connected to the plate, a bracket applied to the side bar and formed with an opening corresponding to the opening therein, said bracket being formed with a laterally projecting ear, a laterally swinging trip hook pivotally mounted upon the ear and formed with a nose adapted to engage a selected link of the bale supporting chain and enter the corresponding openings of the side bar and bracket, a spring connecting the trip hook and before mentioned plate and tending to normally hold the trip hook in inoperative position, a longitudinally swinging latch bar pivotally mounted upon the side bar and adapted to engage the trip hook to hold the same in operative position, a trip rope connected to the latch bar, and guide means upon one end of the frame for engagement with the trip rope.

In testimony whereof I affix my signature in presence of two witnesses.

ELMER L. YOUNG.

Witnesses:
W. WAYNE VAN GUNDY,
THOMAS H. GORDON.

Copies of this patent may be obtained for five cents each, by addressing the "Commissioner of Patents, Washington, D. C."